US009370254B2

(12) United States Patent
Weber (10) Patent No.: US 9,370,254 B2
(45) Date of Patent: Jun. 21, 2016

(54) VOLUMINOUS PADDED CHAIR

(71) Applicant: Heather Linn Weber, Rocklin, CA (US)

(72) Inventor: Heather Linn Weber, Rocklin, CA (US)

( * ) Notice: Subject to any disclaimer, the term of this patent is extended or adjusted under 35 U.S.C. 154(b) by 0 days.

(21) Appl. No.: 14/614,057

(22) Filed: Feb. 4, 2015

(65) Prior Publication Data

US 2015/0296996 A1  Oct. 22, 2015

Related U.S. Application Data

(60) Provisional application No. 61/981,572, filed on Apr. 18, 2014.

(51) Int. Cl.
| | | |
|---|---|---|
| *A47C 7/62* | (2006.01) | |
| *A47D 1/00* | (2006.01) | |
| *A47C 4/54* | (2006.01) | |
| *A47C 3/16* | (2006.01) | |
| *B60N 2/28* | (2006.01) | |
| *A47C 7/02* | (2006.01) | |
| *A47C 27/08* | (2006.01) | |

(52) U.S. Cl.
CPC ... *A47D 1/00* (2013.01); *A47C 3/16* (2013.01); *A47C 4/54* (2013.01); *B60N 2/286* (2013.01); *B60N 2/2806* (2013.01); *B60N 2/2812* (2013.01); *A47C 7/021* (2013.01); *A47C 27/086* (2013.01)

(58) Field of Classification Search
CPC ........ A47C 3/16; A47C 7/021; A47C 27/086; A47C 4/54; A47D 1/00
USPC ............... 297/188.14, 452.17; 5/655.4, 655.9
See application file for complete search history.

(56) References Cited

U.S. PATENT DOCUMENTS

| | | | | | |
|---|---|---|---|---|---|
| D244,569 | S | * | 6/1977 | Laroye | B43M 3/045 D30/118 |
| 4,281,873 | A | * | 8/1981 | Holland | A47C 17/045 297/118 |
| 4,586,747 | A | * | 5/1986 | Taylor | A47D 1/004 297/181 |
| 5,332,286 | A | * | 7/1994 | Atherton | A47D 1/103 297/188.14 |
| 5,580,132 | A | * | 12/1996 | Rediske | A47C 7/021 108/43 |
| D554,379 | S | * | 11/2007 | Weber | D6/333 |
| 7,942,478 | B2 | * | 5/2011 | Cymbalski | B60N 2/28 297/148 |
| 8,091,965 | B2 | * | 1/2012 | Flannery | A47D 1/103 297/250.1 |
| 8,267,473 | B2 | * | 9/2012 | Flannery | A47D 1/103 297/250.1 |
| 8,727,448 | B1 | * | 5/2014 | Pagano | A47D 1/008 297/250.1 |
| 8,836,964 | B2 | * | 9/2014 | Boston | B43M 3/045 358/1.14 |
| D741,611 | S | * | 10/2015 | Lee | D6/364 |

* cited by examiner

*Primary Examiner* — Chi Q Nguyen
(74) *Attorney, Agent, or Firm* — Vincent G. LoTempio; Kloss, Stenger & LoTempio; David T. Stephenson (57) ABSTRACT

A voluminous padded chair or cushion forms an all-encompassing supportive structure through a voluminous, substantially donut shaped configuration. The voluminous configuration includes a padding, inflation, or liquids in the chair, a back portion that supports the back, neck and head of an infant, and a pair of support arms. A front portion provides an anchor for tethering toys and a tray thereto. A base seat for sitting is effective for absorbing urine and soil. The voluminous configuration supports and enwraps parts of the user's body to minimize random movement and thus preventing user from sliding down onto their back from a seated position. The chair is sufficiently voluminous, so that the chair is prevented from overturning from an upright position, even when the chair rests on an uneven surface or is occupied by a user who is moving excessively.

19 Claims, 3 Drawing Sheets

VOLUMINOUS PADDED CHAIR

CROSS REFERENCE TO RELATED APPLICATION

This application claims the benefit of U.S. Provisional Application of Heather Linn Weber, application No. 61/981,572, filed 18 Apr. 2014, having the title INFANT SUPPORT CUSHION, which is incorporated herein by reference in its entirety.

FIELD OF THE INVENTION

The present invention relates generally to a voluminous padded chair. More so, a voluminous padded chair forms an all-encompassing supportive structure for at least partially restraining an infant inside a voluminous, substantially donut shaped configuration having a back support, a pair of arm supports, a front support, and an absorbent base for sitting.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, child safety seats are seats designed specifically to protect children from injury or death during collisions. Automobile manufacturers may integrate child safety seats directly into their vehicle's design. Most commonly, these seats are purchased and installed by consumers. The seats looks like normal adult seats, but often have a few extra restraining bars and padding positioned throughout. This is often necessary since the child does not have full muscle control yet.

It is known that infants typically cannot sit on their own, unaided. A number of support seats and cushions have been devised to help infants remain upright in a seated position. These designs typically lack the quality of 360° support, thus causing the infant to slump, slide down onto their back, or tip forwards or sideways out of the seat or cushion. Also, some of these and similar designs lack the quality of design that prevents an infant of wiggling out of the seat due to arching their backs or using their legs to maneuver themselves out of the seat.

However, some of these designs have been recalled due to safety concerns and lawsuits, and seat belts have been added to solve this problem, but it can still be difficult to put the infant in the seat without the seat belt clip pinching the infant's thighs and the low position of the seat belt renders it almost useless. There is still also the risk the infant can tip the seat over due to the seats flawed design, even while connected to the seat with a seat belt.

A seat belt added to fix this problem can still be dangerous due to pinching of the infant's legs from the seat belt clip and the fact that the flawed seat design can still allow the infant to use its own weight to tip the seat over while connected to the seat. The seatbelt is also complicated to fasten and requires lifting a heavy child safety seat to access the free ends of the seat belt.

Other proposals have involved child safety seats. The problem with these devices is that they do not prevent a child from squirming out and can tip over when the child moves excessively.

Thus, an unaddressed need exists in the industry to address the aforementioned deficiencies and inadequacies. Even though the above cited methods for a child support seat or cushion meets some of the needs of the market, a chair or cushion that has sufficient padding and volume to restrict excessive movement by an infant, yet still enable functional movement is still desired.

SUMMARY OF THE INVENTION

The present invention is directed to a voluminous padded chair or cushion that forms an all-encompassing supportive structure for at least partially restraining an infant inside a voluminous, substantially donut shaped configuration. The voluminous support configuration may include a padding, inflation, or liquids in the chair that protect against impacts and provide a comfortable and supportive resting surface for a user. The support components may include, without limitation, a back support, a pair of arm supports, a front support, and a detachable base. The voluminous configuration of the chair may be efficacious for enwrapping the user to support parts of the user's body, minimize random movement by the user, and enabling a user, such as an infant to receive additional structural support for performing basic functions. The chair is also sufficiently voluminous, so that the chair is prevented from overturning from an upright position, even when the chair rests on an uneven surface or is occupied by a user who is moving excessively. Finally, the voluminous configuration protects the user from forceful impacts and harmful engagement with objects.

In some embodiments, the chair may include a plurality of padded support components that detachably join to form the chair. The support components may include, without limitation, a back support, a pair of arm supports, a front support, and a base. The support components are detachably interconnected to form the general configuration of a donut shaped chair. Suitable materials for the chair may include, without limitation, leather, plastic, vinyl, or vinyl-type plastic material. These materials are conducive to wipe clean the surface, as well as to compress and fold the chair for storage and portability.

In one novel aspect, a filler occupies an interior region of each support component. The filler may provide soft cushioning for a user, while still providing sufficient compactness to enable the support components to provide torso, back, neck, arm, and leg support. In some embodiments, each support component may not have the same amount or type of filler; and thus, may not have equal compactness. This is because different body parts of the user may require different amounts of support or cushioning.

The chair comprises multiple support components that detachably join to form the enwrapping configuration discussed above. A back support provides a generally elongated, rectangular padded support component, which serves to provide a brace and cushioning to the back, neck, and head of a user. The back support comprises an upper back portion and a lower back portion. The upper back portion may have a generally crescent-shape. The back support may be wider in the center than at the ends to create additional elevation for supporting the head and neck. The back support may also be sufficiently voluminous so as to inhibit the chair from tipping over when the user moves excessively or when resting on an uneven surface.

A pair of arm supports join with each end of the back support. The pair of arm supports are disposed at a generally perpendicular orientation to the back support. Each arm support is defined by an upper arm portion and a lower arm portion. The pair of arm supports may be slightly bowed to form a partial-circle, or donut-like appearance.

In some embodiments, the chair comprises a front support that is generally elongated and voluminous. The front support orients generally parallel to the back support, and from each end, joins with each arm support. The front support may include an upper front portion and a lower front portion. The front support, pair of arm supports, and back support join together into a generally oval shape having a 360° donut shape. Theses support components may be sealed, fused, clamped, or sewn together.

In some embodiments, the lower front portion may include a pair of openings that are sized and dimensioned to enable passage of a pair of substantially linear members, such as the legs from an infant. The openings may be sufficiently voluminous and cushioned so as to press against the linear members or any object that passes through. This partially restrictive configuration of the openings may help restrict excessive movement through the openings. In one embodiment, a bottom opening section is wider than a top opening section.

The upper front portion is conducive to supporting a tray, such as a food tray. The upper front portion may also include an anchor portion to retain objects. The anchor portion may include two loops that are configured to receive a cable that is tethered to a toy, utensil, plate, key, tool, or other object. However, in other embodiments, the anchor portion may comprise other anchoring mechanisms. In one embodiment, the upper front portion may stop an infant's fall forward and give an infant or developmentally delayed child a surface to grasp for maintaining balance, while still using and strengthening the muscles needed to sit upright without support.

In some embodiments, the chair may include a base. The base forms a supportive platform on which the user may sit. The base forms a substantially horizontal plane beneath the lower back portion, the pair of lower arm portions, and the lower front portion. The generally rigid, planar configuration of the base works with the substantially voluminous back support, arm supports, and front support to help prevent the chair from tipping over. Various fasteners may be used to fasten the base to the other pieces of the chair, including, without limitation, buttons, hook and loop fasteners, adhesives, fusion, sewing, and frictional engagement. In some embodiments, the base is moisture absorbent and has a removable cover.

A first aspect of the present invention provides a chair for providing voluminous support and enhancing stability, comprising:

a back support defined by an upper back portion and a lower back portion, the back support configured into a substantially voluminous configuration, wherein the voluminous configuration of the back support at least partially restricts movement in a rear direction and at least partially inhibits the chair from overturning from an upright position;

a pair of arm supports defined by an upper arm portion and a lower arm portion, each arm support disposed to join in a generally perpendicular orientation with one end of the back support, the pair of arm supports configured into the substantially voluminous configuration, wherein the voluminous configuration of the pair of arm supports at least partially restricts movement in a lateral direction and at least partially inhibits the chair from overturning from the upright position;

a front support defined by an upper front portion and a lower front portion, the front support disposed to form a substantially parallel alignment with the back support, the front support further disposed to join with the pair of arm supports, the lower front portion comprising a pair of openings, the front support configured into the substantially voluminous configuration, wherein the voluminous configuration of the front support at least partially restricts movement in a forward direction and at least partially inhibits the chair from overturning from the upright position; and a base defined by a substantially flat shape, the base further defined by an upper base surface and a lower base surface, the upper base surface disposed to join with the lower back portion, the lower arm portion, and the lower front portion, the base forming a substantially voluminous configuration, wherein the voluminous configuration of the base at least partially restricts movement in a downward direction and at least partially inhibits the chair from overturning from the upright position.

In a second aspect of the present invention, the chair is an infant chair.

In another aspect, the voluminous configuration comprises padding.

In another aspect, the padding includes at least one member selected from the group consisting of: sheet foam, loose fiberfill, foam core, down, and feathers.

In another aspect, the back support, the pair of arm supports, and the front support join to form a substantially donut shaped chair.

In another aspect, the back support, the pair of arm supports, the front support, and the base are detachable.

In another aspect, the voluminous configuration of the back support is greater than the voluminous configuration of the front support or the voluminous configuration of each of the arm supports.

In another aspect, the upper back portion is configured to be operable to support a head and a neck.

In another aspect, the lower back portion is configured to be operable to support a back.

In another aspect, the upper arm portion is configured to be operable to support an arm.

In another aspect, the front support is configured to be operable to support a chest area.

In another aspect, the pair of openings in the lower front portion are configured to be operable to enable passage of a pair of legs.

In another aspect, the upper front portion comprises an anchor portion.

In another aspect, the anchor portion comprises a pair of loops configured to enable passage of a cable that is tethered to a toy.

In another aspect, the upper front portion is configured to detachably join with a tray.

In another aspect, the tray is disposed to fasten to the anchor portion.

In another aspect, the pair of front openings are configured to be wider at a bottom opening section that at a top opening section.

In another aspect, the base comprises a moisture and odor absorbent composition.

In another aspect, the base comprises a removable cover.

In another aspect, the base joins with the lower back portion, the lower arm portion, and the lower front portion with a base fastener.

In another aspect, the base fastener includes at least one member selected from the group consisting of: a hook and loop fastener, a snap button, and a tie strap.

It is one objective of the present invention to provide a cushioned infant sitting support that is useful from an infant's first attempts to sit upright when the infant falls forward, backward, or to the sides.

It is another objective to provide a voluminous padded chair that can be used as a cushion by younger developmentally delayed children to give support to sit upright.

It is another objective to provide a voluminous padded chair that is easy to wipe clean and can be deflated and folded into a small enough parcel that it can easily be stored in small spaces or packed in a suitcase when traveling.

Yet another objective is to provide a voluminous padded chair that is safe, comfortable, effective, economical and convenient.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The present invention and the manner in which it may be practiced is further illustrated with reference to the accompanying drawings wherein.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

In one embodiment of the present invention, presented in FIGS. 1-6, a voluminous padded chair 100 is configured to form an all-encompassing supportive chair 100. The chair 100 forms a voluminous, substantially donut shaped configuration. In one embodiment, an infant can be restrained inside the full, voluminous chair 100 to form a secure cocoon during transport in a vehicle.

Additionally, the voluminous configuration of the chair 100 may be efficacious for enwrapping the user to support parts of the user's body, minimize random movement by the user, and enabling a user, such as an infant to receive additional structural support for performing basic functions. Furthermore, the chair 100 is sufficiently voluminous, such that the chair 100 is prevented from overturning from an upright position, even when the chair 100 rests on an uneven surface or is occupied by a user who is moving excessively. Thus, the chair has sufficient padding and volume to restrict excessive movement by an infant, yet still enable functional movement.

The chair 100 is constructed from any number of paddings, including, polymer based fillers, air, or liquids to achieve the voluminous configuration. The voluminous configuration of the chair provides a comfortable and supportive resting surface and dampens impacts and engagement with objects.

The chair 100 is efficacious for providing a supportive structure for an infant. Specifically, the chair 100 is intended for young infants who can support their own heads, but who cannot yet sit upright on their own. Those skilled in the art will recognize that the chair 100 can be used by an infant from the earliest developmental stage when the infant learns to sit upright, or by a younger, developmentally delayed child.

In one embodiment of the invention, a donut-shaped pillow surrounds the seating in a 360°, thus provides the infant with 360° of support for retaining the infant seated in an upright manner. However, in other embodiments, the chair 100 may be used to support an eclectic assortment of users, including, without limitation, the elderly and infirm, the mentally retarded, cerebral palsy patients, astronauts in space, and roller coaster occupants.

Figure 1:
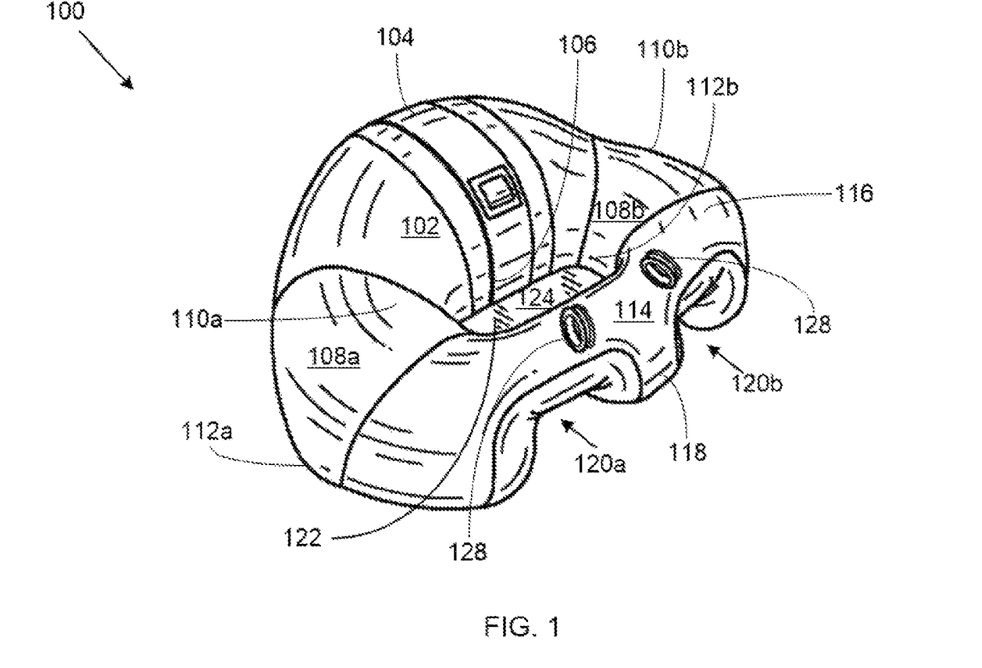
FIG. 1 is a perspective side view of an exemplary voluminous padded chair, in accordance with an embodiment of the present invention.

As referenced in FIG. 1, the chair 100 may include a plurality of padded support components that detachably join to form the chair 100. The support components may include, without limitation, a back support 102, a pair of arm supports 108a, 108b, a front support 114, and a base 122. The support components are detachably interconnected to form the general configuration of a donut shaped chair 100. Suitable materials for the chair 100 may include, without limitation, leather, plastic, vinyl, or vinyl-type plastic material. These materials are conducive to wipe clean the surface, as well as to compress and fold the chair 100 for storage and portability.

In one novel aspect, a filler (not shown) occupies an interior region of each support component. The filler may provide soft cushioning for a user, while still providing sufficient compactness to enable the support components to support the back, neck, arm, and legs. In some embodiments, each support component may not have the same amount or type of filler; and thus, may not have equal compactness. This is because different body parts of the user may require different amounts of support or cushioning.

For example, without limitation, the filler in the back support 102 may have a density of 2.5 pounds and a compression factor of 35, while the filler in the pair of arm supports 108a, 108b may have a density of 1.5 and a compression factor of 20. In this example, the back support 102 is more compact and offers less cushioning than the pair of arm supports 108a, 108b. This is because the back support 102 is configured to support a substantial amount of weight and movement from the user. In some embodiments, the filler may include, without limitation, sheet foam, loose fiberfill, foam core, down, and feathers. However, in other embodiments, the filler may include a gas, whereby the pieces are inflated. The pieces may also be filled with water and be segregated from inside for enhanced regulation of the water contents.

Figure 2:
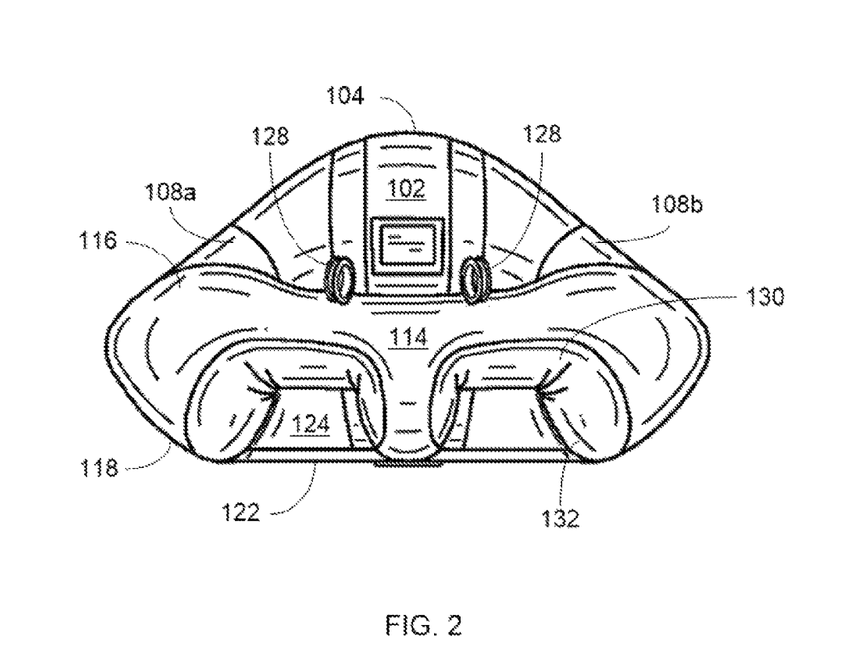
FIG. 2 is a frontal view of an exemplary voluminous padded chair, in accordance with an embodiment of the present invention.

As shown in FIG. 2, the chair 100 comprises multiple support components that detachably join to form the enwrapping configuration discussed above. A back support 102 provides a generally elongated, rectangular padded support component, which serves to provide a brace and cushioning to the back, neck, and head of a user. The back support 102 comprises an upper back portion 104 and a lower back portion 106. The upper back portion 104 may have a generally crescent-shape. The back support 102 may be wider in the center than at the ends to create additional elevation for supporting the head and neck.

Figure 3:
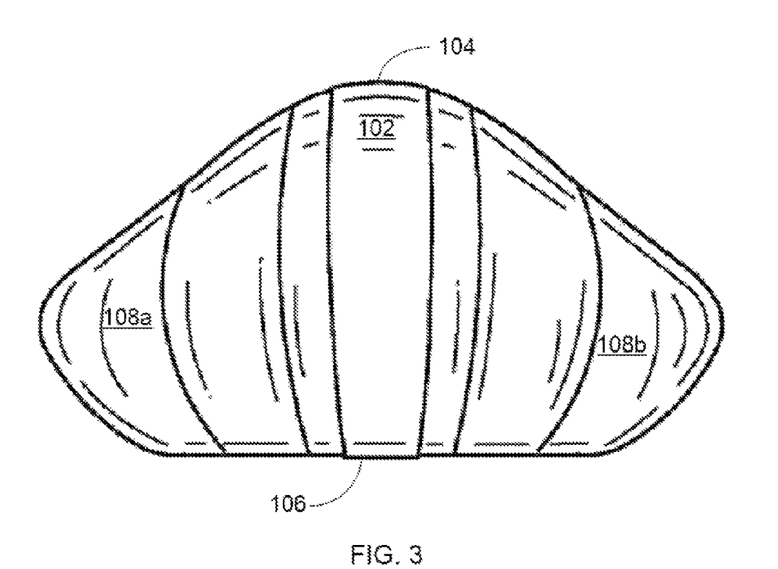
FIG. 3 is a rear view of an exemplary voluminous padded chair, in accordance with an embodiment of the present invention.
Figure 4:
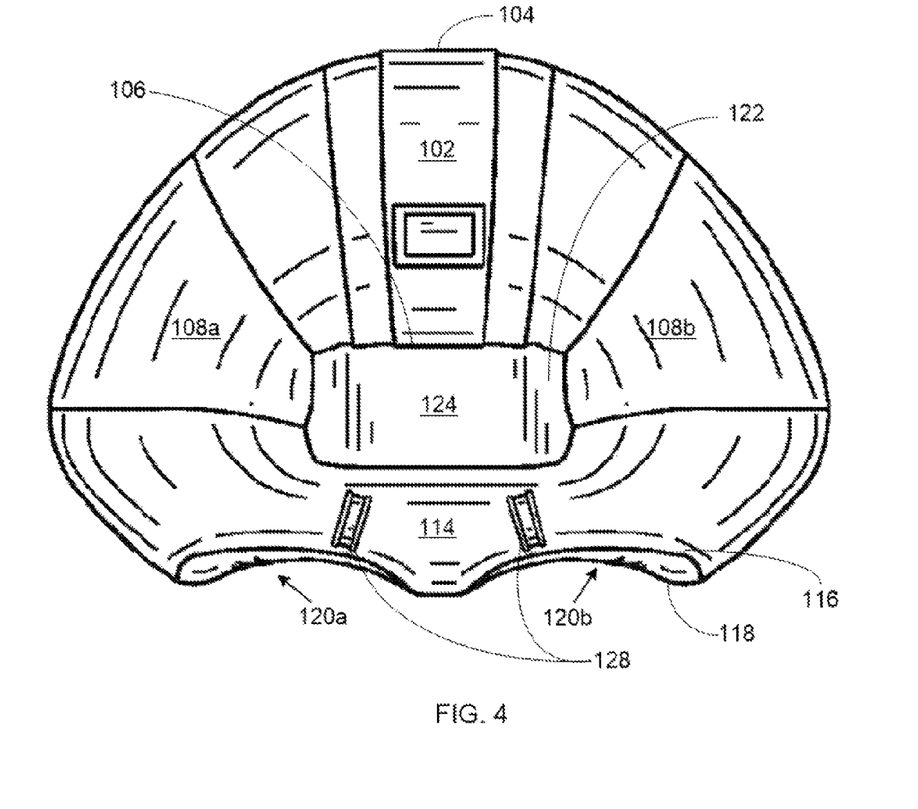
FIG. 4 is a top view of an exemplary voluminous padded chair, in accordance with an embodiment of the present invention.

Turning now to FIG. 3, the back support 102 may also be sufficiently voluminous so as to inhibit the chair 100 from tipping over when the user moves excessively or when resting on an uneven surface. For example, the voluminous configuration of the back support 102 at least partially restricts movement in a rear direction and at least partially inhibits the chair 100 from overturning from an upright position FIG. 4 shows a pair of arm supports 108a, 108b that join with each end of the back support 102. The pair of arm supports 108a, 108b are disposed at a generally perpendicular orientation to the back support 102. Each arm support 108a, 108b is defined by an upper arm portion 110a, 110b and a lower arm portion 112a, 112b. The pair of arm supports 108a, 108b may be slightly bowed to form a partial-circle, or donut-like appearance. The pair of arm supports 108a, 108b have a voluminous configuration that at least partially restricts movement in a lateral direction and at least partially inhibits the chair 100 from overturning from the upright position.

In some embodiments, the chair 100 comprises a front support 114 that is generally elongated and voluminous. The front support 114 orients generally parallel to the back support 102, and from each end, joins with each arm support. The front support 114 may include an upper front portion 116 and a lower front portion 118. The front support 114, pair of arm supports 108a, 108b, and back support 102 join together into a generally oval shape having a 360° donut shape. Theses support components may be sealed, fused, clamped, or sewn together. The voluminous configuration of the front support 114 at least partially restricts movement in a forward direction and at least partially inhibits the chair 100 from overturning from the upright position.

In some embodiments, the lower front portion 118 may include a pair of openings 120a, 120b that are sized and dimensioned to enable passage of a pair of substantially linear members, such as the legs from an infant. The openings 120a, 120b may be sufficiently voluminous and cushioned so as to press against the linear members or any object that passes through. This partially restrictive configuration of the openings 120a, 120b may help restrict excessive movement through the openings 120a, 120b. In one embodiment, a bottom opening section 132 is wider than a top opening section 130. The acute angle formed by this configuration may be effective in holding the legs in place more securely.

Returning now to FIG. 1, the upper front portion 116 is conducive to supporting a tray, such as a food tray. The upper front portion 116 may also include an anchor portion 128 to retain objects. The anchor portion 128 may include two loops that are configured to receive a cable that is tethered to a toy, utensil, plate, key, tool, or other object. However, in other embodiments, the anchor portion 128 may comprise other anchoring mechanisms. In one embodiment, the upper front portion 116 may stop an infant's fall forward and give an infant or developmentally delayed child a surface to grasp for maintaining balance, while still using and strengthening the muscles needed to sit upright without support.

In some embodiments, the chair 100 may include a base 122. The base 122 forms a supportive platform on which the user may sit. The base 122 is defined by an upper base surface 124 and a lower base surface 126. The base 122 forms a substantially horizontal plane beneath the lower back portion 106, the pair of lower arm portion 112a, 112bs, and the lower front portion 118. The generally rigid, planar configuration of the base 122 works with the substantially voluminous back support 102, arm supports 108a, 108b, and front support 114 to help prevent the chair 100 from tipping over.

Figure 5:
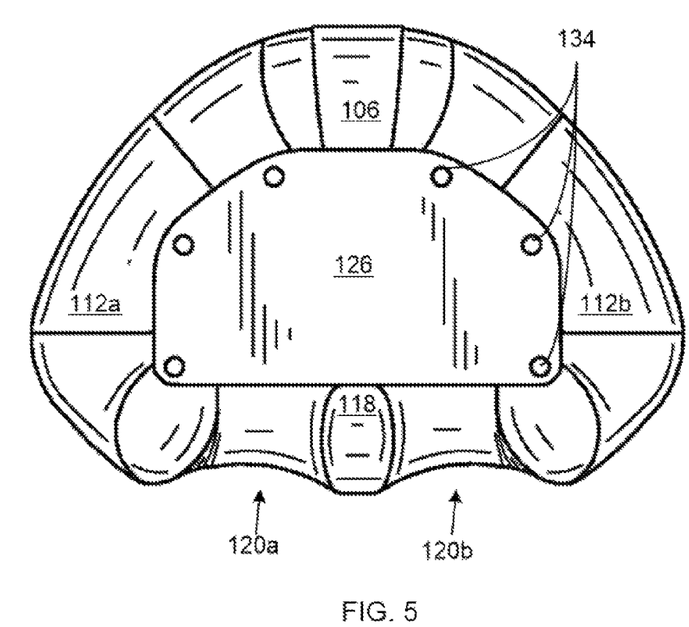
FIG. 5 is a bottom view of an exemplary voluminous padded chair, in accordance with an embodiment of the present invention.

FIG. 5 references at least one base fastener 134. The at least one base fastener 134 may fasten the base 122 to the other pieces of the chair 100, including, without limitation, buttons, hook and loop fasteners, adhesives, fusion, sewing, and frictional engagement. In some embodiments, the base 122 is moisture absorbent and has a removable cover. In some embodiments, the base 122 forms a seat that attaches to the bottom of the lower front portion 118 at the openings 120a, 120b so that the base 122 is restricted from sliding or rolling backward due to an infant's leg movement. The base 122 may have an absorbent quality to retain urine or spilled liquid from transferring to the floor or carpet.

Figure 6:
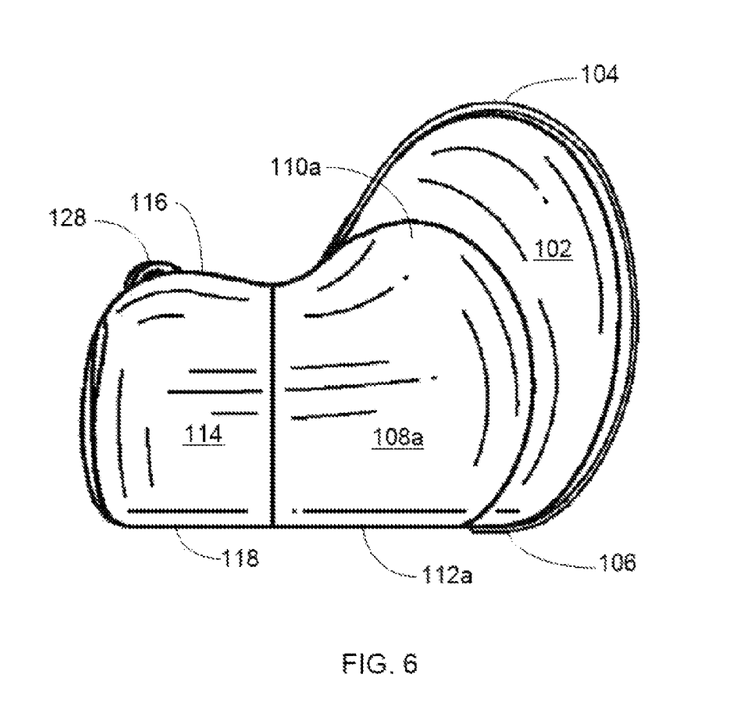
FIG. 6 is an elevated side view of an exemplary voluminous padded chair, in accordance with an embodiment of the present invention.

In operation, the chair 100 is meant for floor use and to be used under adult supervision. Those skilled in the art will recognize that use of the chair 100 may be dangerous on an elevated or unstable surface. However, the voluminous configuration is effective in preventing the chair 100 from toppling over, even on an uneven surface. This stable foundation is illustrated in FIG. 6.

In an initial step of operation, the chair 100 is effectively used in a vehicle as a baby car seat. The vehicle seat buttons underneath the seat should be unsnapped. This may include two front button snaps (one on the right and one on the left) that are closest to the front of the seat. A second step may include placing the seat on the floor. Facing the seat, the baby van be held hold baby under the arms and place baby's feet into the seating area. Another step may include gently sliding the arm across the baby's back to support the head and back while keeping one hand on chest for support.

Next, a user may remove the hand from the baby's chest and carefully place the baby's feet into each of the leg openings 120a, 120b in the front support 114. The positioning of the legs in this manner may require the anchor portion 128, such as a toy loop, to be slightly tilted upwards. From here, the baby may gently be lowered into the chair 100 while making sure baby's legs are going through the leg openings 120*a*, 120*b*. The two buttons from the vehicle may then be snapped close under the right and left sides of the seat. In one alternative embodiment, the chair 100 may be used and operated similarly for patients in a physical therapy setting, larger infants, and smaller children with cerebral palsy or other neurological disorders.

It is also significant to note that the present invention may be fabricated from easy to obtain materials. In one possible embodiment, the outer shell of the support components is constructed from the following materials, without limitation: 2 ribbons ⅜"×5"; a hook and loop fastener ¾"×30 ½"; a hook and loop fastener ¾"×24 ½" piece and ¾"×6" piece; 6 sets of 7/16" diameter-Nickel/Brass gripper snaps-open prong rings and studs; 6 sets of 7/16" diameter-Nickel/Brass gripper snaps-open prong rings and sockets; 1 Hugaboo™ Logo; 1 Law label, 1 Fire Rating label, and 1 Care label; and thread.

In the same possible embodiment, a user, such as a furniture designer, may initially cut pattern pieces sewn together with a serger sewing machine use 4-thread overlock stitch. The type of thread used can be a 100% Polyester Overlock thread. Next, the Hugaboo™ Logo, the ribbons sewn onto the 2 "Toy Loops QQ", creating the anchor portion 128 (toy loops) and sewing them onto "Tray TT", and sewing on the hook and loop fasteners are sewn using a single needle sewing machine. The type of thread used is all purpose mercerized cotton (37%) and polyester (63%) thread.

After that is complete, the outer shell pattern pieces are cut. The user cuts 1 of "Center CC" pattern, the "right (good) side" of the fabric is face up. The user should make sure the straight-of-the-grain line on the pattern is parallel with the selvedge. The user then marks the notches and placement of the Hugaboo Logo and the ¾"×30 ½" hook fastener. Next, is to cut 1 of "Center BB" pattern, "right (good) side" of the fabric is face up. Make sure the straight-of-the-grain line on the pattern is parallel with the selvedge. Mark the notches and placement of the ¾"×24½" loop Velcro.

A next step comprises cutting 1 of "Center AA" pattern, "right (good) side" of the fabric is face up. At this stage, it is important to make sure the straight-of-the-grain line on the pattern is parallel with the selvedge. The notches are then marked. The user may then cut a pair of "Back Curve DD" on a wrong side of the fabric. The user should make sure the straight-of-the-grain line on the pattern is parallel with the selvedge. Next, mark the notches and placement of Law labels and Care Labels.

Those skilled in the art, in light of the present teachings, will recognize that the general donut shape of the chair 100 and design of the support cushion is necessary. The hook and loop fastener for the outer shell and button snaps or other means to attach the seat bottom are necessary to the overall function of the invention. The type of fabric used to make the infant support cushion can vary but should be comfortable and safe for infants.

In some embodiments, the entire chair 100 may be constructed of solid foam rather than an inner and outer shell stuffed with fiberfill. The entire chair 100 could be enlarged to help in supporting larger infants with neurological disorders. In yet another embodiment, a pouch, such as a bottle holder for holding a baby bottle could somehow be sewn into or onto either arm support 108*a*, 108*b* of the chair 100.

In one alternative embodiment, an extra head pillow could be attached to the upper back portion 104 by means of button snaps, hook and loop fastener, or any other attachment means well known in the textile arts, in order to provide extra stability for an infant's head. The toy loop attachments are optional. Instead of using hook and loop fasteners to enclose the outer shell around the inner pillow, a zipper could be used.

In one alternative embodiment, the chair 100 can be enlarged or elongated in certain areas to help with the ingress or egress of the infant. The chair 100 can be made of solid foam and still function similarly. The chair 100 can be filled with weighed plastic stuffing beads or pellets and still function similarly. The base 122 can be sewn completely onto the underside of the lower front portion 118 and pair of arm supports 108*a*, 108*b* and still function similarly.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A chair for providing voluminous support and enhancing stability, the chair comprising:
    a back support defined by an upper back portion and a lower back portion, the back support configured into a substantially voluminous configuration, wherein the voluminous configuration of the back support at least partially restricts movement in a rear direction and at least partially inhibits the chair from overturning from an upright position;
    a pair of arm supports defined by an upper arm portion and a lower arm portion, each arm support disposed to join in a generally perpendicular orientation with one end of the back support, the pair of arm supports configured into the substantially voluminous configuration, wherein the voluminous configuration of the pair of arm supports at least partially restricts movement in a lateral direction and at least partially inhibits the chair from overturning from the upright position;
    a front support defined by an upper front portion and a lower front portion, the front support disposed to form a substantially parallel alignment with the back support, the front support further disposed to join with the pair of arm supports, the lower front portion comprising a pair of openings, the front support configured into the substantially voluminous configuration,
    wherein the voluminous configuration of the front support at least partially restricts movement in a forward direction and at least partially inhibits the chair from overturning from the upright position;
    a base defined by a substantially flat shape, the base further defined by an upper base surface and a lower base surface, an upper base surface disposed to join with the lower back portion, the lower arm portion, and the lower front portion, the base forming a substantially voluminous configuration, wherein the voluminous configuration of the base at least partially restricts movement in a downward direction and at least partially inhibits the chair from overturning from the upright position; and
    wherein the back support, the pair of arm supports, and the front support loin to form a substantially ring shaped pillow that surrounds and supports an infant: and
    wherein a filler occupies an interior region of the substantially ring shaped pillow.

2. The chair of claim 1, wherein the voluminous configuration is formed from a loose filler surrounded by a fabric.

3. The chair of claim 2, wherein the loose filler includes at least one member selected from the group consisting of: loose fiberfill, down, and feathers.

4. The chair of claim 1, wherein the back support, the pair of arm supports, the front support, and the base are detachable.

5. The chair of claim 1, wherein the voluminous configuration of the back support is greater than the voluminous configuration of the front support or the voluminous configuration of each of the arm supports.

6. The chair of claim 1, wherein the pair of openings in the lower front portion are configured to be operable to enable passage of a pair of legs.

7. The chair of claim 1, wherein the upper front portion comprises an anchor portion.

8. The chair of claim 7, wherein the anchor portion comprises a pair of loops configured to enable passage of a cable that is tethered to a toy.

9. The chair of claim 1, wherein the pair of openings are configured to be wider at a bottom opening section than at a top opening section.

10. The chair of claim 1, wherein the base joins with the lower back portion, the lower arm portion, and the lower front portion with a base fastener wherein the upper base surface is below the ring shaped pillow and upper base surface is nearly level with a floor surface such that the infant is substantially in contact with the floor surface and a weight bearing surface for the infant is the floor surface.

11. The chair of claim 1, wherein the filler occupies an interior region of the substantially ring shaped pillow.

12. The chair of claim 1, wherein the upper front portion comprises an anchor portion, the anchor portion configured to fasten a. cable tethered to a toy.

13. The chair of claim 1, wherein the openings are sufficiently narrow and cushioned so as to circumferentially press against a linear member that passes through without causing discomfort to the infant.

14. The chair of claim 1, wherein a central portion of the front support extends vertically downward to the floor surface, wherein the central portion of the front support has the openings on both sides to allow passage of an infant's legs while preventing the infant from sliding forward and through the front support.

15. A chair for providing voluminous support and enhancing stability, the chair comprising:
   a back support defined by an upper back portion and a lower back portion, the back support configured into a substantially voluminous configuration, wherein the voluminous configuration of the back support at least partially restricts movement in a rear direction and at least partially inhibits the chair from overturning from an upright position;
   a pair of arm supports defined by an upper arm portion and a lower arm portion, each arm support disposed to join in a generally perpendicular orientation with one end of the back support, the pair of arm supports configured into the substantially voluminous configuration, wherein the voluminous configuration of the pair of arm supports at least partially restricts movement in a lateral direction and at least partially inhibits the chair from overturning from the upright position;
   a front support defined by an upper front portion and a lower front portion, the front support disposed to form a substantially parallel alignment with the back support, the front support further disposed to join with the pair of arm supports, the lower front portion comprising a pair of openings, wherein the pair of openings are configured to be wider at a bottom opening section than at a top opening section, the front support configured into the substantially voluminous configuration, wherein the voluminous configuration of the front support at least partially restricts movement in a forward direction and at least partially inhibits the chair from overturning from the upright position; and
   a base defined by a substantially flat shape, the base further defined by an upper base surface and a lower base surface, an upper base surface disposed to join with the lower back portion, the lower arm portion, and the lower front portion, the base forming a substantially voluminous configuration, the base comprising a base cover, wherein the voluminous configuration of the base at least partially restricts movement in a downward direction and at least partially inhibits the chair from overturning from the upright position;
   wherein the back support, the pair of arm supports, the front support join to form a substantially ring shaped pillow that surrounds and supports an infant; and
   wherein a filler occupies an interior region of the substantial ring shaped pillow; and
   wherein the upper base surface is below the ring shaped pillow and the upper base surface is nearly level with a floor surface such that the infant is substantially in contact with the floor surface, wherein the floor surface substantially bears a weight of the infant.

16. A chair for providing voluminous support and enhancing stability, the chair comprising:
   a back support defined by an upper back portion and a lower back portion, the back support configured into a substantially voluminous configuration, wherein the voluminous configuration of the back support at least partially restricts movement in a rear direction and at least partially inhibits the chair from overturning from an upright position;
   a pair of arm supports defined by an upper arm portion and a lower arm portion, each arm support disposed to join in a generally perpendicular orientation with one end of the back support, the pair of arm supports configured into the substantially voluminous configuration,
   wherein the voluminous configuration of the pair of arm supports at least partially restricts movement in a lateral direction and at least partially inhibits the chair from overturning from the upright position;
   a front support defined by an upper front portion and a lower front portion, the front support disposed to form a substantially parallel alignment with the back support, the front support further disposed to join with the pair of arm supports, the lower front portion comprising a pair of openings, front support configured into the substantially voluminous configuration, wherein the voluminous configuration of the front support at least partially restricts movement in a forward direction and at least partially inhibits the chair from overturning from the upright position; and a base defined by a substantially flat shape, the base further defined by an upper base surface and a lower base surface, the upper base surface disposed to join with the lower back portion, the lower arm portion, and the lower front portion, the base forming a substantially voluminous configuration, the base comprising a base cover;
   wherein the voluminous configuration of the base at least partially restricts movement in a downward direction and at least partially inhibits the chair from overturning from the upright position;
   wherein the back support, the pair of arm supports, the front support join to form a substantially ring shaped pillow that surrounds and supports an infant; and wherein a filler occupies an interior region of the substantially ring shaped pillow; and wherein the upper base surface is below the ring shaped pillow and the upper base surface is nearly level with a floor surface such that the infant is substantially in contact with the floor surface, wherein the floor surface substantially bears a weight of the infant.

17. The chair of claim 16, wherein a central portion of the front support extends vertically downward to the floor surface, wherein the central portion of the front support has the openings on both sides to allow passage of an infant's legs while preventing the infant from sliding forward and through the front support.

18. The chair of claim 16, wherein the filler includes at least one member selected from the group consisting of: loose fiberfill, soft foam core, down, and feathers.

19. The chair of claim 16, wherein the filler is surrounded by a fabric.

* * * * *